United States Patent [19]

Wu

[11] Patent Number: 5,437,353

[45] Date of Patent: Aug. 1, 1995

[54] MAGNETIC ADJUSTABLE BRAKING DEVICE

[76] Inventor: Hong-Chi Wu, No. 1-2, Lane 975, Chun-Jih Road, Tao-Yuan City, Taiwan

[21] Appl. No.: 175,510

[22] Filed: Dec. 30, 1993

[51] Int. Cl.⁶ ............................ F16F 15/03; B60L 7/28
[52] U.S. Cl. ....................................... 188/164; 310/105
[58] Field of Search ............... 188/161, 164, 162, 157, 188/268; 310/105

[56] References Cited

U.S. PATENT DOCUMENTS 5,096,024 3/1992 Wu ........................................ 188/164
5,154,623 10/1992 Kuwahara ........................... 188/164

FOREIGN PATENT DOCUMENTS 316159 10/1971 U.S.S.R. ............................... 188/162

Primary Examiner—Matthew C. Graham
Attorney, Agent, or Firm—Morton J. Rosenberg; David I. Klein

[57] ABSTRACT

A magnetic adjustable braking device comprises a rotating housing, a magnetic conductor ring, a shaft member, a positioning device, a sliding housing and a driving device. The effective coupling area between the permanent magnetic and magnetic conductor ring can be adjusted and varied to provide variable braking torque (load) of the sporting device. This braking device has a compact size for easily applying it to different sporting equipment.

3 Claims, 6 Drawing Sheets

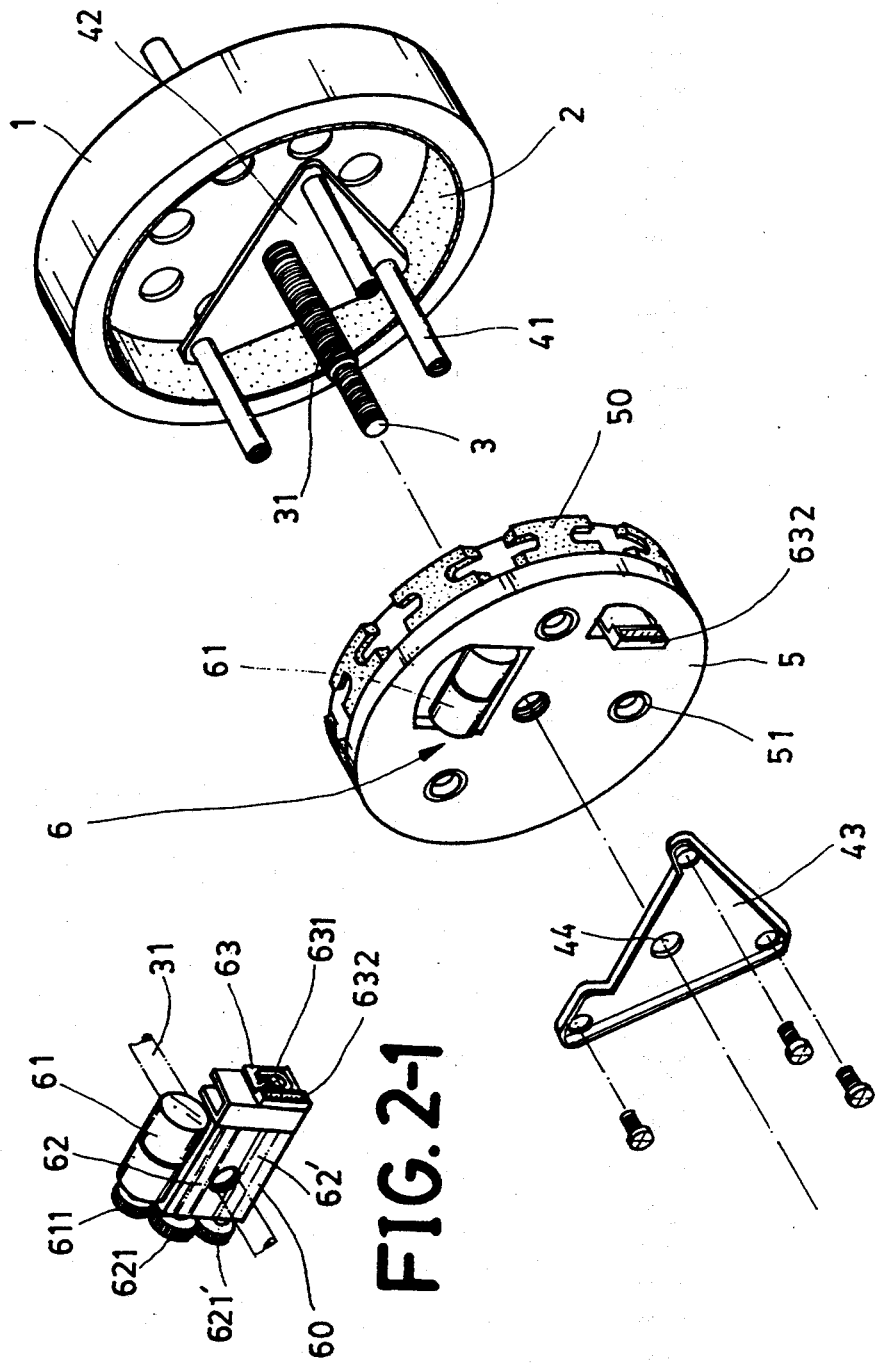

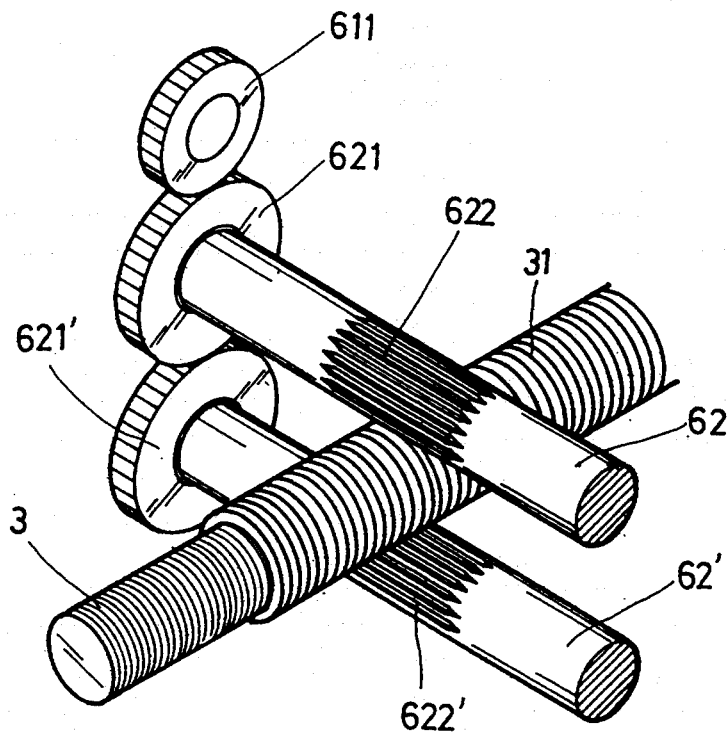
F I G. 2-2
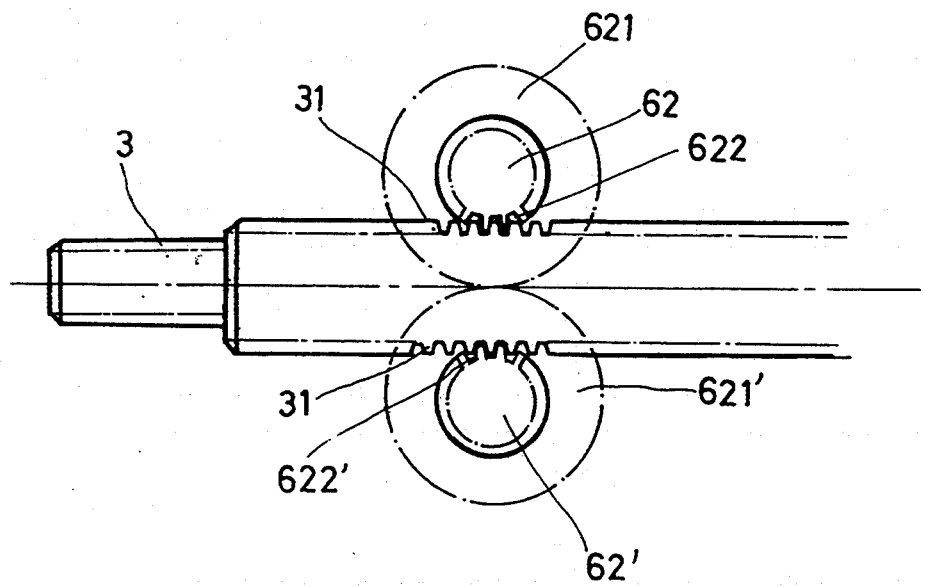
F I G. 2-3

MAGNETIC ADJUSTABLE BRAKING DEVICE

BACKGROUND OF THE INVENTION

1. Field of the Invention

This invention relates to an adjustable braking device and more particularly to a magnetic adjustable braking device for facilitating or providing variable loads to sporting equipment or the like. This subject braking device features a compact configuration, stable performance and excellent durability.

2. Prior Art

Braking devices used on sporting equipment can generally be categorized into the following areas: 1) friction type; 2) hydraulic cylinder; 3) fan; and 4) generator. In the friction type braking device a disadvantage is that such is easily worn out and provides unstable loads. For the hydraulic cylinder type braking device, the cylinder has been found to leak, with the added disadvantage of noise and poor braking performance especially when the temperature of the liquid is high. With respect to the fan type, Such has a very large size and is not easy to adjust. Additionally, the fan type braking device has poor aesthetic appeal. With regard to the generator type of braking device, the cost is high and construction is complicated, leading to a higher cost.

SUMMARY OF THE INVENTION

It is well known that when an electrical conductor is placed under a variable magnetic flux, a local closed loop within the conductor will generate a back emf. Accordingly, a local eddy current is generated. According to Lenz's law, the direction of the magnetic field established by this eddy current is opposed to the original magnetic flux. From the Maxwell's equation, it is evident that the torque is proportional to the square of the magnetic flux density which passes through the air gap.

It is the object of this invention to vary the magnetic flux density passing through the air gap to adjust the torque which can be applied on a braking device for sporting equipment.

It is still another object of this invention to provide a magnetic adjustable braking device which can be used to replace the braking device of prior art systems and provide a braking device with a compact configuration, stable performance and excellent durability.

It is still a further object of this invention to provide a magnetic adjustable braking device where the braking value can be set and then the braking device controls the coupling area between the magnet and magnetic conductor ring to adjust the braking resistance continuously.

It is still another objective of this invention to provide a magnetic adjustable braking device which has a compact configuration to increase the inner space of the sporting equipment and expand the utilization of the latter.

BRIEF DESCRIPTION OF THE DRAWINGS

The objects and other advantages of this instant invention will become more apparent in conjunction with a preferred embodiment and drawings accompanied thereof; wherein

FIG. 2 is an exploded perspective view of a magnetic adjustable braking device made according to this invention;

FIG. 2-1 is a perspective view of the driving device made according to this invention;

FIG. 2-2 is a perspective view of the driving device gear meshing components made according to this invention;

FIG. 2-3 is an elevational view of the gear meshing components of the driving device made according to this invention;

FIG. 3 is a cross-sectional view of a magnetic adjustable braking device made according to this invention;

DETAILED DESCRIPTION OF THE PREFERRED EMBODIMENTS

Figure 1:
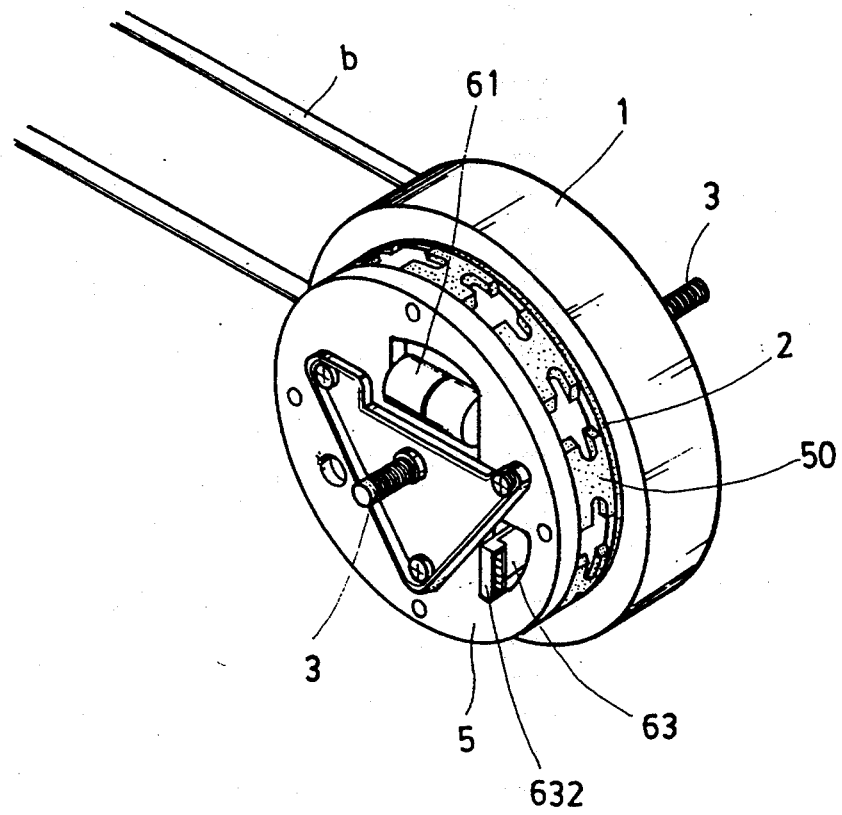
FIG. 1 is a perspective view of a magnetic adjustable braking device made according to this invention.
Figure 3:
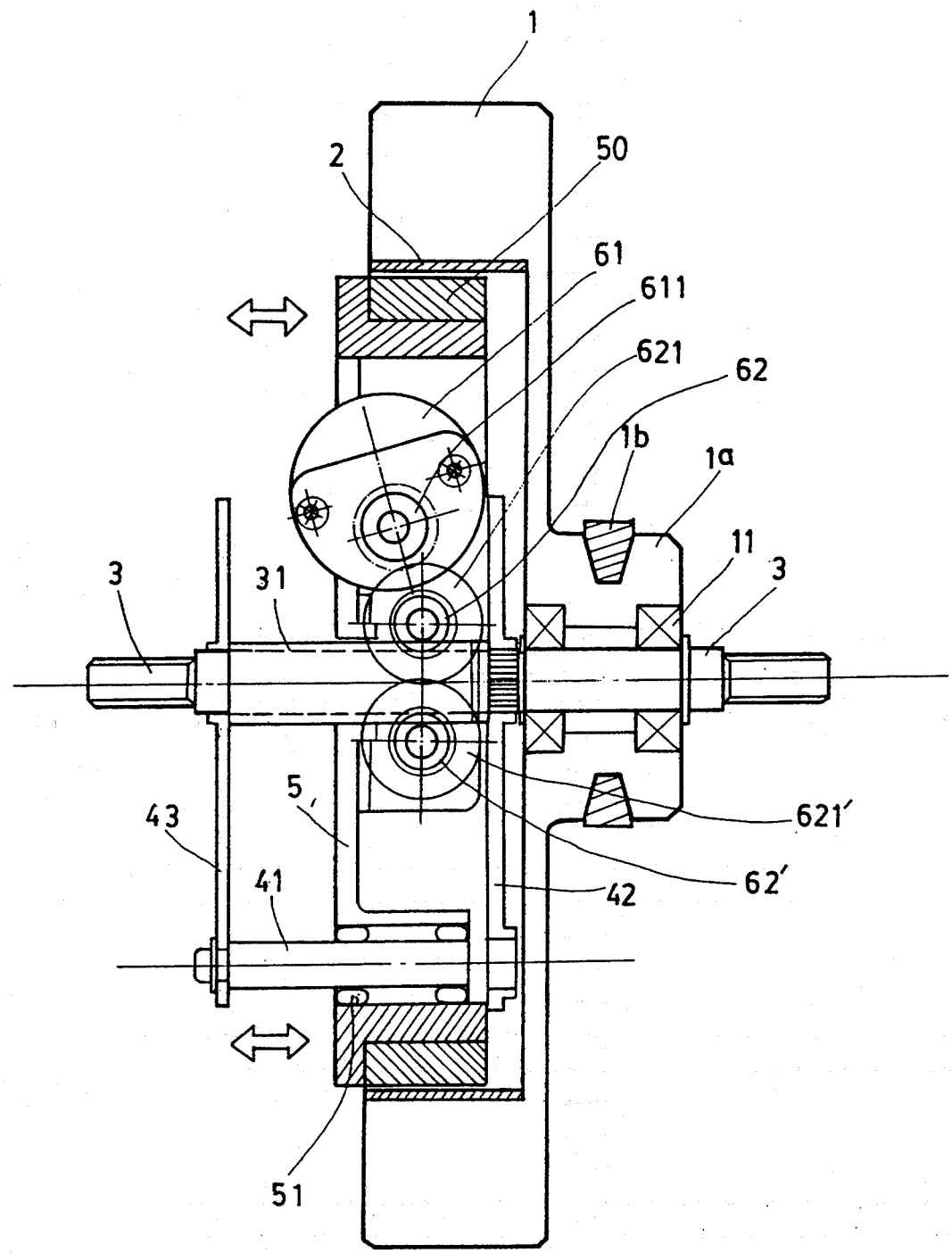

Referring now to FIGS. 1-3, the magnetic adjustable braking device comprises a rotating housing 1. A flywheel 1a is integrated in one-piece formation to the outer wall of the rotating housing 1. A belt 1b is connected to the flywheel 1a and has a bearing 11 disposed inside the flywheel 1a. A magnetic conductor ring 2 is disposed at the inner periphery of the rotating housing 1.

A shaft member 3 is disposed inside the bearing 11 of the flywheel 1a, with the shaft member 3 having a worm gear portion 31 located at the mid-portion of the shaft member 3.

A positioning device 4 is provided which includes a supporting post 41, an inner guiding plate 42 and an outer guiding plate 43, which is connected to the shaft member 3 passing through hole 44. A sliding housing 5 having a lubricated bearing 51 is slidably received by the supporting post 41, with a permanent magnetic 50 mounted at the inner side of the sliding housing 5.

A driving device 6 disposed inside the sliding housing 5 includes a driving motor 61 supported by a bracket 60. A pinion 611 is disposed at the output shaft of the motor 61. A pair of rod members 62, 62' pass through the bracket 60, and rod members 62, 62' are connected via a pair of gears 621, 621' disposed respectively at the rod members 62, 62'. The gear 621 is meshed to and driven by the pinion 611, whereby the rod members 62, 62' are rotated in opposing directions. The middle portion of the rod members 62, 62' are provided with worm gears 622, 622' which are meshed or matingly engaged to the worm gear portion 31 of the shaft member 3, which is shown in FIGS. 2-2, 2-3.

Figure 5:
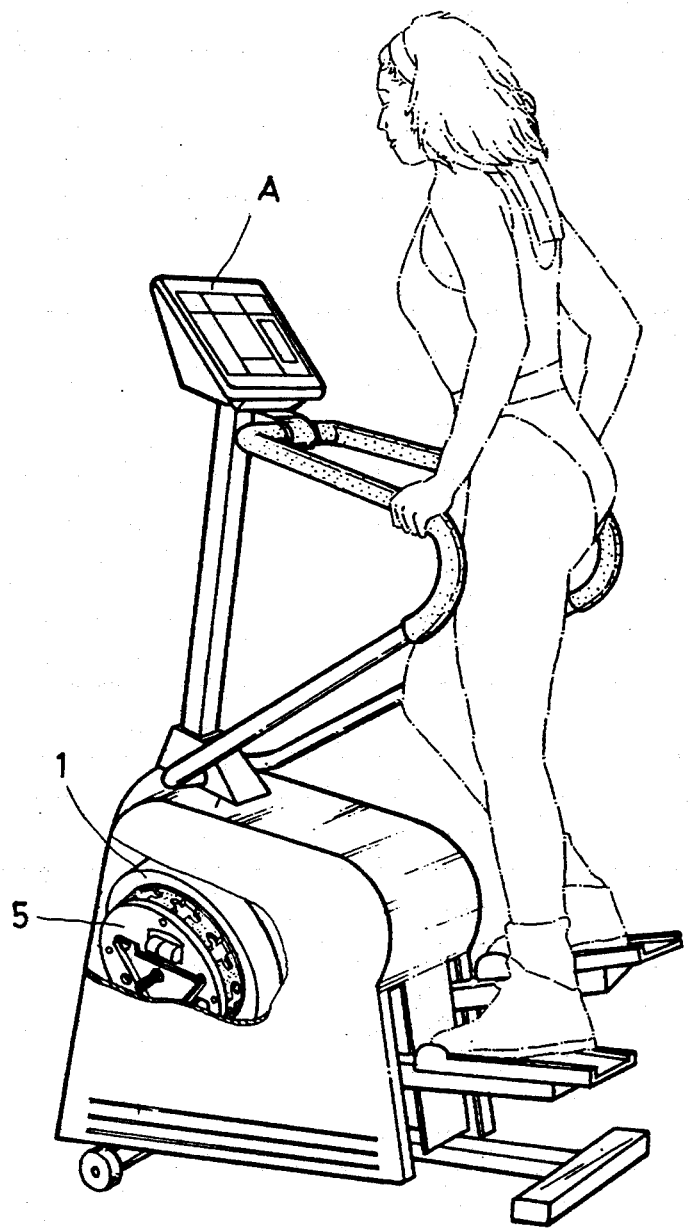
FIG. 5 is a perspective view of a sporting equipment incorporated with a magnetic adjustable braking device made according to this invention.

A decoder 63 is disposed at one side of the driving device 6. A flexible plate 631 is disposed on one side of the decoder 63 and is driven by the worm gear 62'. By contact of the flexible plate 631 to the circuit of the decoder 63, the rotational position of the worm gear 62' can be coupled to the control panel A (such as shown in FIG. 5) by means of socket 632. By assembling of the above aforementioned elements, a compact configuration of a sporting equipment for variable loads is achieved.

The operation of this braking device made according to this invention is described in the following paragraphs.

When the user inputs a desired value of load through the control panel A to the sporting equipment, the motor 61 drives the rod members 62, 62' in respective clockwise and counterclockwise rotation. Since the U-shaped bracket 60 is mounted on the sliding housing 5, when the rod members 62, 62' rotate, the sliding housing 5 moves upward on the supporting post 41. By this arrangement, the effective coupling area between the permanent magnet 50 and magnetic conductor ring 2 varies accordingly. The braking torque of the sliding housing 5 decreases when the effective coupling area of the magnetic conductor ring 2 decreases; however, opposingly, the braking torque of the rotating housing 1 increases when the effective coupling area of the magnetic conductor ring 2 increases. Consequently, the drag of the rotating housing 1 increases, hence the force applied by the belt 1b increases as well. In light of this movement of the permanent magnet 50, the drag (load) of the rotating housing 1 can be adjusted to variable values.

Figure 4:
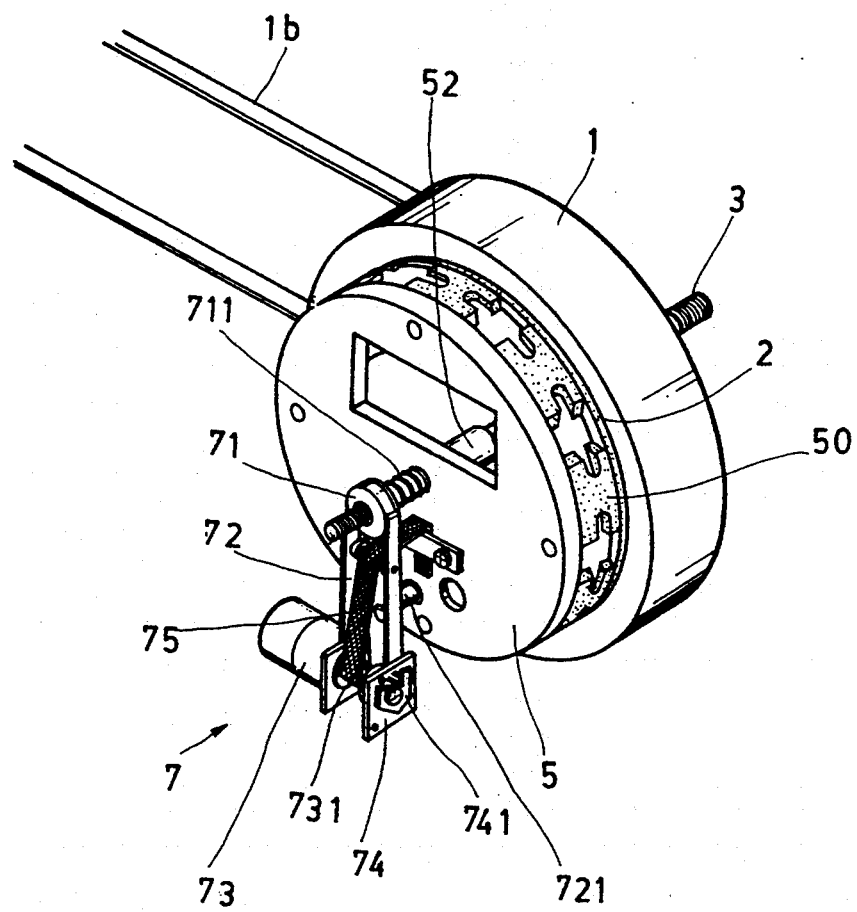
FIG. 4 is another embodiment of a magnetic adjustable braking device made according to this invention.

FIG. 4 discloses a second embodiment having a driving device 7 disposed at one side of the sliding housing 5 to drive a sleeve 52 of the sliding housing 5. The sleeve 52 is movable along the shaft member 3. The driving device 7 includes a fixing sleeve 71 which is fixed to the shaft member 3, a spring member 711 disposed at the inner side of fixing sleeve 71, and a bracket 72 disposed under the spring member 711 which has a guiding post 721 for movement or displacement of sliding housing 5.

A motor 73 having an output shaft 731 is disposed at one side of the bracket 72. When the motor 72 rotates, a flexible plate 74 of the decoder 74 which is disposed at one side of the bracket 72 is moved, and a web member 75 is fixed to the output shaft 731 at one end and the sliding housing 5 at the other end.

By assembling the above described elements, a driving device may be assembled, with the sliding housing 5 biased by the spring member 711 disposed inside the fixing sleeve 73. By this arrangement, the fixing sleeve 52 moves inwardly along the shaft member 3. When the motor 73 is actuated, the web member 75 is wound up to establish a tension force to pull the sliding housing 5. In light of this, the sliding housing 5 moves upwardly along the shaft member 3 and guiding post 721 by means of the sleeve 52. By adjusting the effective coupling area between the permanent magnet 50 and magnetic conductor ring 2, the braking torque of the rotating housing 1 is varied and controlled. In light of this, a driving device is provided to adjust the effective coupling area between the permanent magnet 50 and magnetic conductor ring 2, and braking can be easily controlled.

Since the braking device has a compact size and can be easily applied to different sporting equipment, by addition of control panel A, the sporting load can be easily set and the performance of the sporting device can be easily reached.

Although the present invention has been described in connection with preferred embodiments thereof, many other variations and modifications will now become apparent to those skilled in the art without departing from the scope of the invention. It is preferred, therefore, that the present invention not be limited by the specific disclosure herein, but only by the appended claims.

I claim:

1. A magnetic adjustable braking device, comprising
    a rotating housing having a flywheel which connects with a belt being integrated at the outer wall of the rotating housing, a bearing being disposed inside the flywheel;
    a magnetic conductor ring being disposed at the inner periphery of the rotating housing;
    a shaft member disposed inside the bearing of the flywheel, the shaft member having a worm gear portion at a middle portion of the shaft member;
    a positioning device having a supporting post, inner guiding plate and an outer guiding plate and being connected to the shaft member by means of a hole;
    a sliding housing having a lubricated bearing slidably received by the supporting post, a permanent magnet disposed at inner ring portion of the sliding housing;
    a driving device which is disposed inside the sliding housing, said driving device including a driving motor supported by a bracket, a pinion disposed at the output shaft of the motor, a pair of rod members which pass through the bracket, the rod members being connected via a pair of gears disposed respectively at the rod members, the gears being meshed and driven by the pinion, accordingly, the rod members being rotated in different directions, the middle portion of each of the rod members being provided with a further worm gear which is meshed with the worm gear portion of the shaft member; and
    a decoder disposed at one side of the driving device, a flexible plate being disposed on one side of the decoder and driven by the worm gear, by the contact of the flexible plate to the circuit of the decoder, the rotational position of the worm gear can be supplied to a control panel by means of a socket.

2. A braking device as recited in claim 1, wherein said driving device is disposed at a side of the sliding housing for driving the sleeve of the sliding housing along the shaft member to adjust the effective coupling area between the permanent magnet and magnetic conductor ring.

3. A braking device as recited in claim 1, wherein said driving device comprises
    a fixing sleeve which is fixed to the shaft member, a spring member disposed at the inner side of the fixing sleeve, an additional bracket being disposed under the spring member which has a guiding post for movement of the sliding housing;
    a motor having an output shaft disposed at one side of the additional bracket, when the motor rotates, the flexible plate of the decoder which is disposed at one side of the additional bracket being moved; and
    a web member being fixed to the output shaft at one end and the sliding housing at the other end.

* * * * *